United States Patent
Takezawa et al.

(10) Patent No.: US 11,380,493 B2
(45) Date of Patent: Jul. 5, 2022

(54) ELECTROLYTIC CAPACITOR

(71) Applicant: SUN Electronic Industries Corp., Shijonawate (JP)

(72) Inventors: Takashi Takezawa, Shijonawate (JP); Masakazu Hosogi, Shijonawate (JP); Hajime Kimachi, Shijonawate (JP); Yuya Nagaike, Shijonawate (JP); Takahisa Adachi, Shijonawate (JP)

(73) Assignee: SUN Electronic Industries Corp., Shijonawate (JP)

( * ) Notice: Subject to any disclaimer, the term of this patent is extended or adjusted under 35 U.S.C. 154(b) by 0 days.

(21) Appl. No.: 17/270,472

(22) PCT Filed: Sep. 20, 2018

(86) PCT No.: PCT/JP2018/034885
§ 371 (c)(1),
(2) Date: Feb. 23, 2021

(87) PCT Pub. No.: WO2020/059091
PCT Pub. Date: Mar. 26, 2020

(65) Prior Publication Data
US 2021/0327653 A1    Oct. 21, 2021

(51) Int. Cl.
*H01G 9/15* (2006.01)
*H01G 9/02* (2006.01)
(Continued)

(52) U.S. Cl.
CPC .............. *H01G 9/151* (2013.01); *H01G 9/02* (2013.01); *H01G 9/028* (2013.01); *H01G 9/10* (2013.01)

(58) Field of Classification Search
CPC ..................................................... H01G 9/151
See application file for complete search history.

(56) References Cited

U.S. PATENT DOCUMENTS

| | | |
|---|---|---|
| 2012/0300368 A1 | 11/2012 | Matsuura et al. |
| 2015/0255220 A1 | 9/2015 | Komatsu et al. |

(Continued)

FOREIGN PATENT DOCUMENTS

| | | | |
|---|---|---|---|
| CN | 101057306 A | * 10/2007 | ............. H01G 9/145 |
| CN | 102763181 A | 10/2012 | |

(Continued)

OTHER PUBLICATIONS

International Search Report (with partial translation) dated Nov. 27, 2018, issued in corresponding International Patent Application No. PCT/JP2018/034885.

(Continued)

*Primary Examiner* — Eric W Thomas
(74) *Attorney, Agent, or Firm* — Morgan, Lewis & Bockius LLP

(57) ABSTRACT

An electrolytic capacitor includes a capacitor element, a body case, and a sealing body. The capacitor element has a cathode foil and an anode foil wound up with a separator in between, and has a prescribed solution held between the cathode foil and the anode foil. The body case houses the capacitor element. The sealing body seals the body case. The solution is a fat-soluble antioxidant dissolved in a lypophilic solvent and the separator is configured to be in contact with the sealing body.

12 Claims, 4 Drawing Sheets

(51) Int. Cl.
  *H01G 9/028* (2006.01)
  *H01G 9/10* (2006.01)

(56) References Cited

U.S. PATENT DOCUMENTS

| | | | |
|---|---|---|---|
| 2016/0064151 A1 | 3/2016 | Matsuura et al. | |
| 2017/0148582 A1 | 5/2017 | Matsuura et al. | |
| 2018/0047511 A1 | 2/2018 | Tsuda | |
| 2018/0047521 A1* | 2/2018 | Tsuda | H01G 9/0425 |
| 2018/0218849 A1 | 8/2018 | Matsuura et al. | |
| 2018/0277312 A1 | 9/2018 | Tsubaki et al. | |
| 2019/0259541 A1 | 8/2019 | Tsuda | |
| 2019/0311858 A1* | 10/2019 | Will | H01G 9/02 |
| 2020/0143997 A1 | 5/2020 | Matsuura et al. | |
| 2020/0258693 A1 | 8/2020 | Matsuura et al. | |
| 2020/0266004 A1 | 8/2020 | Tsuda | |
| 2021/0098199 A1 | 4/2021 | Tsuda | |

FOREIGN PATENT DOCUMENTS

| | | |
|---|---|---|
| JP | H01-167965 A | 7/1989 |
| JP | 2000-100670 A | 4/2000 |
| JP | 2005-209902 A | 8/2005 |
| JP | 2006-108650 A | 4/2006 |
| JP | 2006-114540 A | 4/2006 |
| JP | 2006-120830 A | 5/2006 |
| JP | 2007-080888 A | 3/2007 |
| JP | 2014-182978 A | 9/2014 |
| JP | 2018-088306 A | 6/2018 |
| WO | 2011/099261 A1 | 8/2011 |
| WO | 2014/050913 A1 | 4/2014 |
| WO | 2016174806 A1 | 11/2016 |
| WO | 2017094242 A1 | 6/2017 |

OTHER PUBLICATIONS

First Office Action dated Dec. 27, 2021 in Chinese Patent Application 201880097841.5.
Examination Report dated Jan. 13, 2022 in Indian Patent Application 202117006271.
Extended European Search Report (EESR) dated Mar. 28, 2022, issued in corresponding European Patent Application No. 18934106.8.

* cited by examiner

ELECTROLYTIC CAPACITOR

TECHNICAL FIELD

The present invention relates to electrolytic capacitors that are sealed with a sealing member.

BACKGROUND ART

A known electrolytic capacitor is disclosed in Patent Document 1. This electrolytic capacitor has a body case, a capacitor element, and a sealing member. The body case is formed of metal in the shape of a bottomed cylinder, and its cylindrical circumferential wall is closed at one end and is open at the other end to have an opening.

The capacitor element has an anode foil and a cathode foil, both having an oxide coat formed on it, wound up with a separator in between, and is housed inside the body case. Between the anode and cathode foils, an electrolytic solution is held. The anode and cathode foils each have a lead terminal connected to it. The opening of the body case with the capacitor element housed inside it is sealed with a sealing member formed of, for example, rubber, and the lead terminals penetrate the sealing member to be led out of the body case.

It is believed that, when a polymer such as rubber is exposed to the energy of heat or light under the presence of oxygen in air or elsewhere, it is triggered by generation of radicals to initiate a chain of oxidation reactions, resulting in degraded properties. To cope with that, mention is often made of mixing into the sealing member an anti-aging agent for suppressing oxidation reactions.

On the other hand, Patent Document 2 discloses an electrolytic capacitor that has a solid electrolyte instead of an electrolytic solution. This electrolytic capacitor has a body case, a capacitor element, and a sealing member like those of the electrolytic capacitor of Patent Document 1. Between the anode and cathode foils of the capacitor element, an electrically conductive polymer as a solid electrolyte is held. Also held between the anode and cathode foils is a hydrophilic polymer compound that contains moisture.

With the electrolytic capacitor structured as described above, the electrically conductive polymer helps achieve a low ESR. Moreover, the moisture contained in the hydrophilic polymer compound helps repair defects in the oxide coats on the anode and cathode foils.

CITATION LIST

Patent Literature

Patent Document 1: JP-A-2000-100670 (pages 2-4, FIG. 1)

Patent Document 2: WO 2014/050913 (pages 9-23, FIG. 2)

SUMMARY OF INVENTION

Technical Problem

Today, with the trend of diminishing size and increasing performance of the devices that incorporate them, electrolytic capacitors are used increasingly in high-temperature environments, where they are arranged near motors, engines, fast-operation semiconductor devices, and the like that produce large amounts of heat.

With the electrolytic capacitor disclosed in Patent Document 1 mentioned above, the anti-aging agent mixed in the sealing member is consumed as it exerts an antioxidant effect; that is, it is gradually depleted. In the electrolytic capacitor used in a high-temperature environment, as the anti-aging agent is depleted, the sealing member deteriorates rapidly. This often causes the electrolytic solution to evaporate out of the body case, eventually bringing what is called a dried-up state. Hence the problem of the electrolytic capacitor being unable to maintain its characteristics stably for a long period.

Likewise, with the electrolytic capacitor disclosed in Patent Document 2 mentioned above, using it in a high-temperature environment leads to deterioration of the sealing member. As a result, the moisture held between the anode and cathode foils leaks out of the body case, no longer able to repair the oxide coats. Hence the problem of the electrolytic capacitor being unable to maintain its characteristics stably for a long period.

This is true not only with moisture for repairing oxide coats: also in a case where a functional liquid with a function of enhancing the characteristics of an electrolytic capacitor is held in the capacitor element, likewise, as the sealing member deteriorates in a high-temperature environment, the functional liquid leaks out. Hence the problem of the electrolytic capacitor being unable to maintain its characteristics stably for a long period.

An object of the present invention is to provide an electrolytic capacitor that can maintain its characteristics stably for a long period.

Solution to Problem

To achieve the above object, according to one aspect of the present invention, an electrolytic capacitor includes: a capacitor element that has an anode foil and a cathode foil would up with a separator in between and that holds a predetermined solution between the anode and cathode foils; a body case in which the capacitor element is housed; and a sealing member with which the body case is sealed. Here, the solution has a lipid-soluble antioxidant dissolved in a lipophilic solvent, and the separator is in contact with the sealing member.

According to another aspect of the present invention, in the electrolytic capacitor structured as described above, the capacitor element can hold a solid electrolyte.

According to another aspect of the present invention, in the electrolytic capacitor structured as described above, the solution can be an electrolytic solution having the lipid-soluble antioxidant and an electrolyte dissolved in the lipophilic solvent.

According to another aspect of the present invention, in the electrolytic capacitor structured as described above, the concentration of the lipid-soluble antioxidant in the electrolytic solution can be from 1% by weight to 30% by weight.

According to another aspect of the present invention, in the electrolytic capacitor structured as described above, the concentration of the lipid-soluble antioxidant in the electrolytic solution can be from 3% by weight to 20% by weight.

According to another aspect of the present invention, in the electrolytic capacitor structured as described above, the lipophilic solvent can be gamma-butyrolactone.

According to another aspect of the present invention, in the electrolytic capacitor structured as described above, the lipophilic solvent can contain: at least one selected from the group consisting of sulfolane, ethylene glycol, and diethylene glycol; and a nonionic surfactant.

According to another aspect of the present invention, in the electrolytic capacitor structured as described above, the nonionic surfactant can be polyethylene glycol or polyglycerin coupled with a lipophilic group According to another aspect of the present invention, in the electrolytic capacitor structured as described above, the nonionic surfactant can be a copolymer of polyethylene glycol with polypropylene glycol According to another aspect of the present invention, in the electrolytic capacitor structured as described above, the lipid-soluble antioxidant can be a lipid-soluble vitamin.

According to another aspect of the present invention, in the electrolytic capacitor structured as described above, the lipid-soluble vitamin can be tocopherol or tocotrienol.

According to another aspect of the present invention, in the electrolytic capacitor structured as described above, the width of the separator in its shorter-side direction can be larger than the width of the anode and cathode foils in their shorter-side direction, and the separator can protrude farther toward the sealing member than the anode and cathode foils so as to be in contact with the sealing member.

According to another aspect of the present invention, in the electrolytic capacitor structured as described above, the body case can have a constriction protruding from its inner face to press the circumferential face of the sealing member, and the ridge of the constriction can be located farther from the capacitor element than is the middle of the sealing member in its thickness direction.

Advantageous Effects of Invention

According to the present invention, a capacitor element holds a solution having a lipid-soluble antioxidant dissolved in a lipophilic solvent, and a separator is in contact with a sealing member. Thus, the separator permits the lipid-soluble antioxidant to be continuously supplied to the sealing member. The lipid-soluble antioxidant supplied to the sealing member seeps through intermolecular gaps inside the sealing member to reach the inside of the sealing member and the outer face of the sealing member. Thus, the surface of the sealing member is covered with the lipid-soluble antioxidant in the form of oil film, and this helps suppress deterioration of the sealing member for a long period. It is thus possible to prevent the solution held by the capacitor element from leaking out, and to maintain the characteristics of an electrolytic capacitor for a long period.

DESCRIPTION OF EMBODIMENTS

First Embodiment

Figure 1:
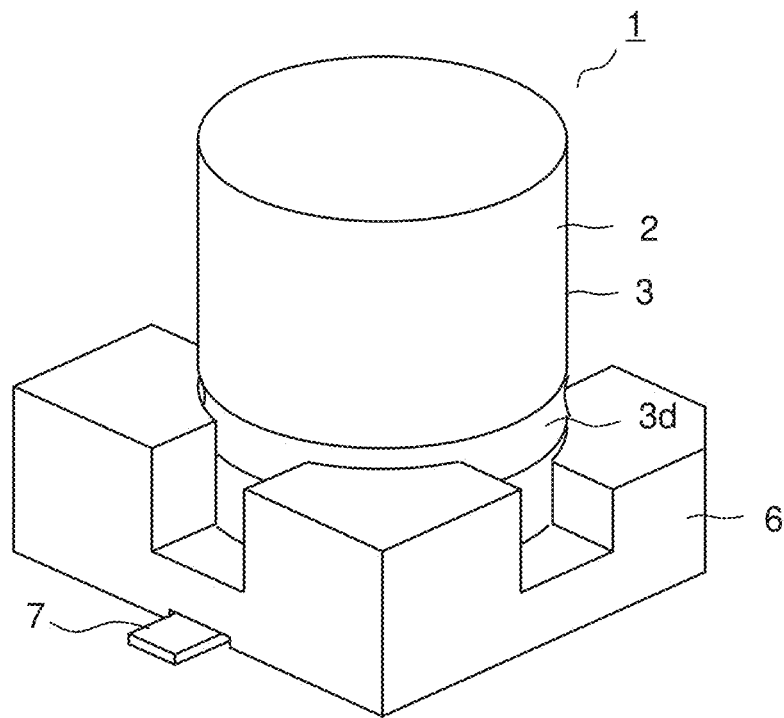
FIG. 1 is a perspective view of an electrolytic capacitor according to a first embodiment of the present invention, as seen from above.
Figure 2:
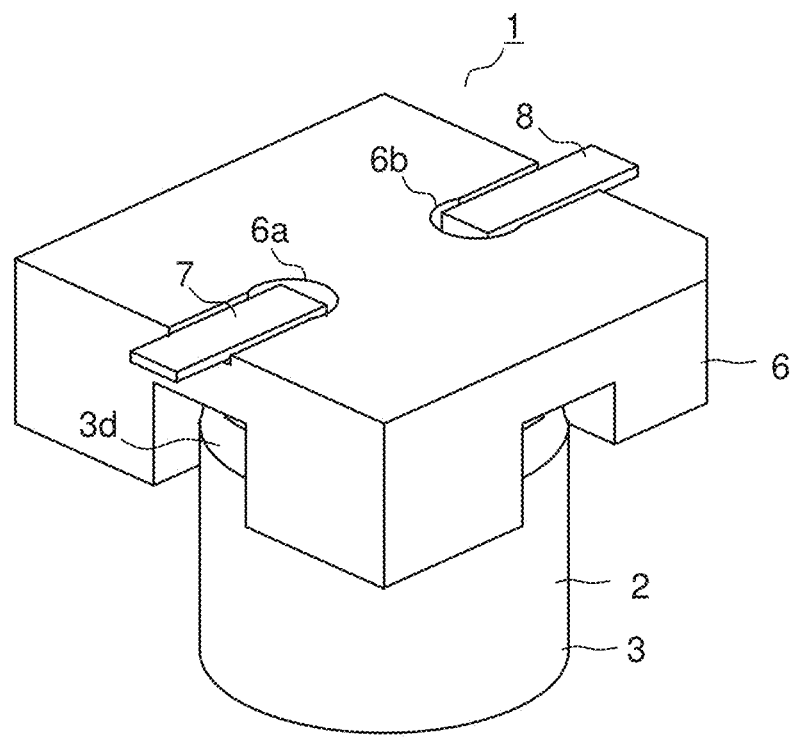
FIG. 2 is a perspective view of an electrolytic capacitor according to the first embodiment of the present invention, as seen from below.

Embodiments of the present invention will be described below with reference to the accompanying drawings. FIGS. 1 and 2 are perspective views showing an electrolytic capacitor 1 according to a first embodiment, as seen from above and from below respectively. The electrolytic capacitor 1 includes a capacitor body 2 and a seat plate 6. The seat plate 6 is formed of synthetic resin, and holds the capacitor body 2. The seat plate 6 has a pair of through holes 6a and 6b formed in it. Lead terminals 7 and 8 (described later) that are led out of the capacitor body 2 are inserted through the through holes 6a and 6b and are bent, so as to be soldered to a circuit board.

Figure 3:
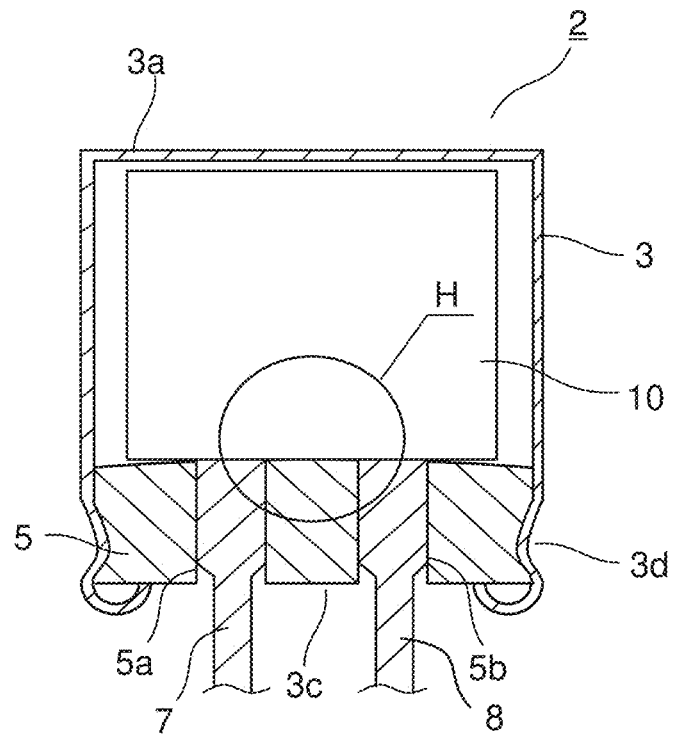
FIG. 3 is a front sectional view showing a capacitor body of an electrolytic capacitor according to the first embodiment of the present invention.

FIG. 3 is a front sectional view of the capacitor body 2. The capacitor body 2 includes a body case 3, a capacitor element 10, and a sealing member 5. The body case 3 is formed of metal such as aluminum in the shape of a bottomed cylinder with a circular cross section, and is open at one end to have an opening 3c. The capacitor element 10 is housed inside the body case 3, and the opening 3c is sealed with the sealing member 5.

Figure 4:
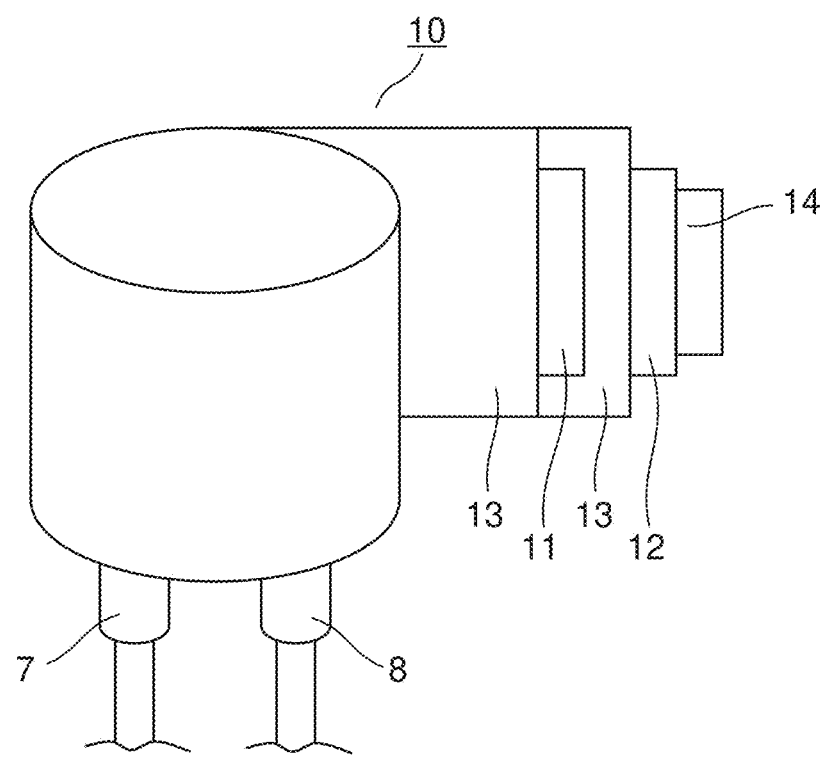
FIG. 4 is a perspective view showing a capacitor element of an electrolytic capacitor according to the first embodiment of the present invention.

FIG. 4 is a perspective view of the capacitor element 10. The capacitor element 10 includes an anode foil 11, a cathode foil 12, and a separator 13. The anode and cathode foils 11 and 12 are each formed of metal foil in the form of an elongate band. The separator 13 is formed of nonwoven fabric or the like in the form of an elongate band.

The capacitor element 10 is formed by winding the anode and cathode foils 11 and 12, with the separator 13 in between, into a cylindrical shape. The terminal end of the anode or cathode foil 11 or 12 is fastened with winding-end tape 14. To the anode foil 11, a lead terminal 7 is connected; to the cathode foil 12, a lead terminal 8 is connected.

The separator 13 is so formed that its width in the shorter-side direction (axial direction) is larger than the width of the anode and cathode foils 11 and 12 in the shorter-side direction. Thus, with respect to the anode and cathode foils 11 and 12, the separator 13 protrudes upward (away from the opening 3c) and downward (toward the opening 3c), thereby preventing short-circuiting between the anode and cathode foils 11 and 12.

The anode foil 11 is formed of a valve metal such as aluminum, tantalum, niobium, or titanium. The cathode foil 12 faces the anode foil 11 across the separator 13, and is formed of aluminum or the like. The anode and cathode foils 11 and 12 have an oxide coat (not illustrated) formed on their surfaces.

Between the anode and cathode foils 11 and 12 of the capacitor element 10, an electrolytic solution is held. Immersing the capacitor element 10 in the electrolytic solution for a predetermined length of time permits the electrolytic solution to permeate into the separator 13, to be held between the anode and cathode foils 11 and 12. The electrolytic solution functions practically as the cathode. The electrolytic solution also helps repair defects in the oxide coats on the anode and cathode foils 11 and 12.

The electrolytic solution is a solution of an electrolyte in a lipophilic solvent. As the lipophilic solvent, gamma-butyrolactone can be used. Also usable as the lipophilic solvent is a liquid containing a nonionic surfactant in at least one of sulfolane, ethylene glycol, and diethylene glycol. Usable as the nonionic surfactant is polyethylene glycol or polyglycerin coupled with a lipophilic group, a copolymer of polyethylene glycol with polypropylene glycol, or the like.

The electrolyte by dissolving into the solvent dissociates into ions to exert electrical conductivity. Usable as the electrolyte is, for example, an organic amine salt of a boric acid compound or of a carbonic acid compound.

The electrolytic solution also contains a lipid-soluble antioxidant that is dissolved in the lipophilic solvent. The lipid-soluble antioxidant engages in an oxidation reaction with oxygen to suppress oxidation of the sealing member 5, as will be described in detail later. As the lipid-soluble antioxidant, an antioxidant that is soluble in a lipophilic solvent, for example a lipid-soluble vitamin, can be used. Examples of lipid-soluble vitamins include, for example, vitamin A (retinol, α-carotene, β-carotene, β-cryptoxanthin), vitamin D (vitamin D2, vitamin D3), vitamin E (tocopherol, tocotrienol), and vitamin K (vitamin K1, vitamin K2, menaquinone-7).

If the concentration of the lipid-soluble antioxidant in the electrolytic solution is lower than 1% by weight, the antioxidant effect on the sealing member 5 cannot be maintained for a long period. If the concentration of the lipid-soluble antioxidant in the electrolytic solution is higher than 30% by weight, the electrolytic solution has so high viscosity that holding the electrolytic solution in the capacitor element 10 takes a long time, leading to increased man-hours. Out of these considerations, it is preferable that the concentration of the lipid-soluble antioxidant in the electrolytic solution be from 1% by weight to 30% by weight. It is further preferable that the concentration of the lipid-soluble antioxidant in the electrolytic solution be from 3% by weight to 20% by weight, because this provides a better antioxidant effect, leading to reduced man-hours.

In FIG. 3, the sealing member 5 is formed as a molding of an electrically insulating elastic material such as rubber, in the shape of a disc having a pair of through holes 5a and 5b. The lead terminals 7 and 8 of the capacitor element 10 are pressed through the through holes 5a and 5b. Usable for the sealing member 5 is butyl rubber, which is high in environmental resistance such as heat aging resistance, chemical resistance, and light resistance, high in electrical resistance, and low in gas permeation. The sealing member 5 can contain an anti-aging agent for suppression of deterioration.

With the sealing member 5 placed in the opening 3c of the body case 3, the open end of the body case 3 is folded onto the sealing member 5. The body case 3 is swaged so as to press the circumferential face of the sealing member 5, forming a constriction 3d that protrudes inward of the body case 3. Thus, the sealing member 5, along with the capacitor element 10, is kept in fixed position and is prevented from dropping off, and the opening 3c of the body case 3 is sealed with the sealing member 5.

Here, the ridge of the constriction 3d is located farther from the capacitor element 10 than is the middle of the sealing member 5 in its thickness direction. Thus, the circumferential face of the sealing member 5 is pressed from below as seen in the figure so that the top face (the face close to the capacitor element 10) of the sealing member 5 bulges upward, with a central part of it protruding toward the capacitor element 10.

Figure 5:
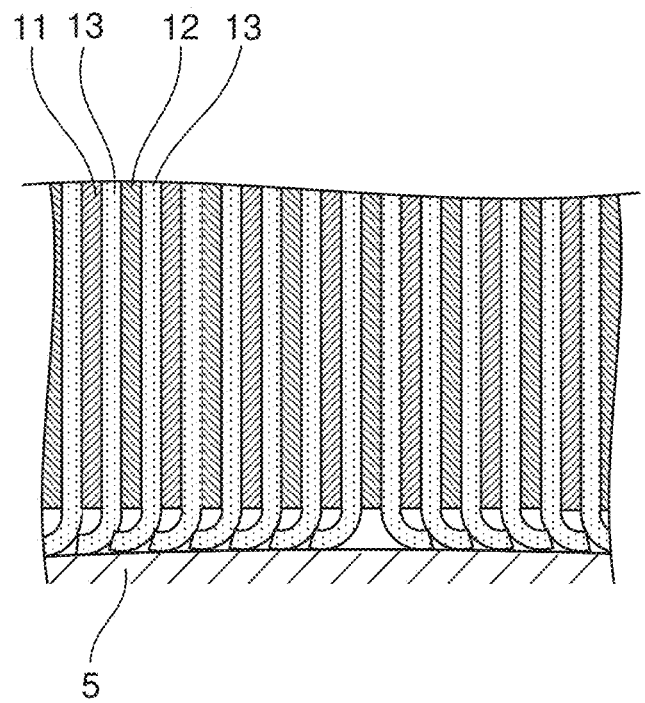
FIG. 5 is a detailed view of part H in FIG. 3.

FIG. 5 is a detailed view of part H in FIG. 3. At least part of the separator 13, which protrudes farther down than the anode and cathode foils 11 and 12, makes contact with the sealing member 5. Here, since a central part of the sealing member 5 bulges to protrude upward, the separator 13 lies along the sealing member 5 such that the former makes secure contact with the latter at a plurality of points or across an area.

The sealing member 5 is continuously supplied, via the separator 13 lying in contact with it, with the lipid-soluble antioxidant in the electrolytic solution. The lipid-soluble antioxidant seeps through intermolecular gaps inside the sealing member 5 to reach the inside of the sealing member 5 and the outer face (the face opposite from the capacitor element 10) of the sealing member 5. As a result, the outer face of the sealing member 5 is covered with the lipid-soluble antioxidant in the form of oil film.

The lipid-soluble antioxidant has a high boiling point and a low melting point (e.g., tocopherol has a boiling point of 235° C. and a melting point of 3° C.). This restrains evaporation of the lipid-soluble antioxidant covering the surface of the sealing member 5. This permits the lipid-soluble antioxidant to remain in liquid phase in a range of temperature from 25° C., i.e., around room temperature, to 150° C., stably keeping a state of oil film.

Thus, while contact between the sealing member 5 and oxygen in air is suppressed, the lipid-soluble antioxidant engages in an oxidation reaction with oxygen at the surface of or inside the sealing member 5. This makes it possible to suppress oxidation-induced deterioration of the sealing member 5 for a long period. It is thus possible to prevent evaporation of the electrolytic solution via a crack or the like in the sealing member 5.

Figure 6:
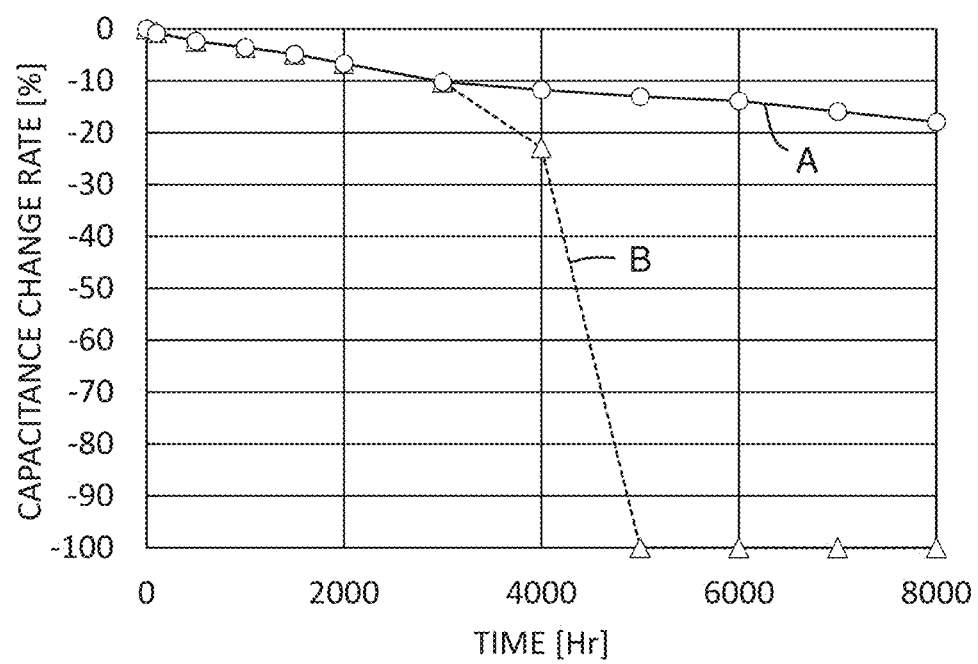
FIG. 6 is a diagram showing the capacitance change rate of an electrolytic capacitor according to the first embodiment of the present invention through endurance tests.

FIG. 6 is a diagram showing how the capacitance of the electrolytic capacitor 1 of this embodiment changes through an endurance test. In the diagram, the vertical axis represents capacitance change rate (in percent) and the horizontal axis represents passage of time.

In the diagram, "A" indicates the electrolytic capacitor 1 of this embodiment, where the electrolytic solution contained, as the lipophilic solvent, gamma-butyrolactone and, as the lipid-soluble antioxidant, tocopherol. The concentration of the lipid-soluble antioxidant in the electrolytic solution was 10% by weight. The sealing member 5 was formed of butyl rubber, with an anti-aging agent added to it.

In the diagram, "B" indicates an electrolytic capacitor of a comparative example, where, as compared with the electrolytic solution for the electrolytic capacitor 1 indicated by A, the lipid-soluble antioxidant was omitted.

Figure 7:
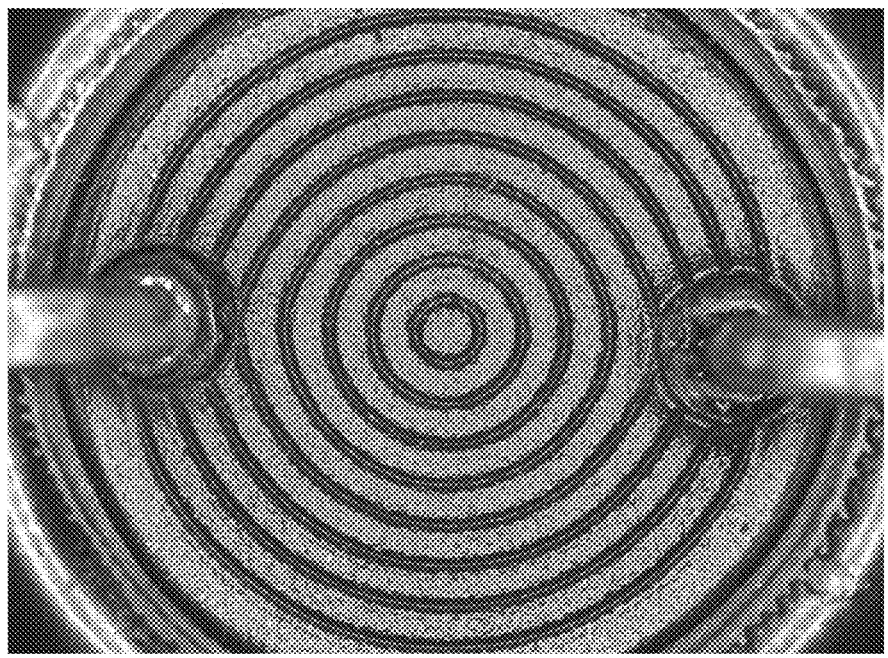
FIG. 7 is a diagram showing a sealing member of an electrolytic capacitor according to the first embodiment of the present invention after an endurance test.
Figure 8:
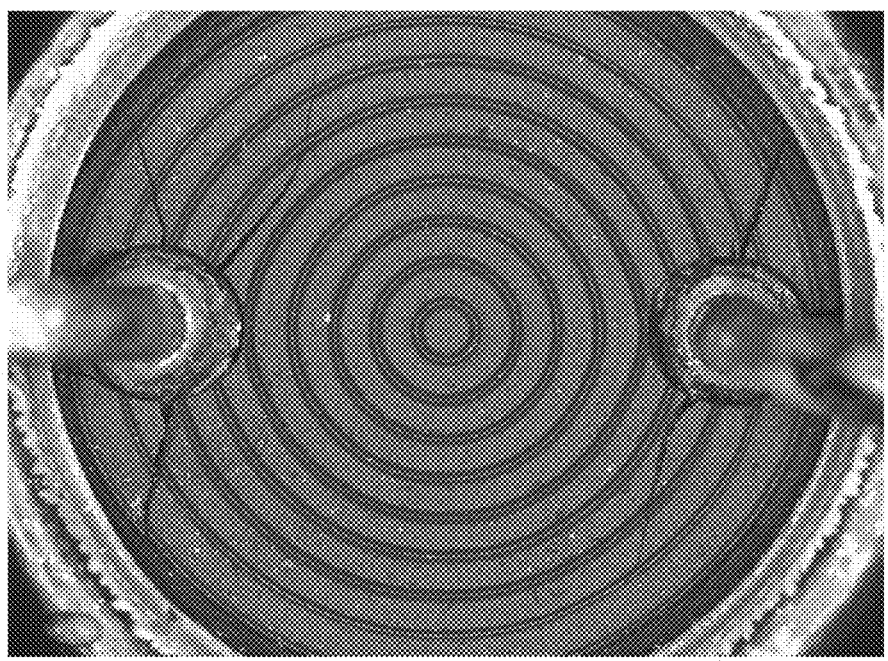
FIG. 8 is a diagram showing a sealing member of an electrolytic capacitor of a comparative example for comparison with the present invention after an endurance test.

The electrolytic capacitors 1 of this embodiment and the comparative example were subjected to an endurance test in a high-temperature environment of 150° C., and their capacitance was measured. FIG. 7 is a photograph image of the sealing member 5 of the electrolytic capacitor 1 indicated by A after the passage of 8000 hours. FIG. 8 is a photograph image of the sealing member 5 of the electrolytic capacitor 1 indicated by B after the passage of 4000 hours.

The endurance test with the electrolytic capacitor of the comparative example revealed the following. After the passage of 1500 hours, the anti-aging agent lost its effect and left the surface of the sealing member 5 in a dried state. After the passage of 4000 hours, the sealing member 5 developed cracks (see FIG. 8), and the electrolytic solution evaporated rapidly, resulting in a sharp drop in capacitance.

In contrast, the electrolytic capacitor 1 of this embodiment proved to be as follows. After the passage of 1500 hours and even 8000 hours, the surface of the sealing member 5 appeared glossy by being covered with the lipid-soluble antioxidant in the form of oil film. That is, at the surface of the sealing member 5, tocopherol evaporated slower than gamma-butyrolactone and permitted the lipid-soluble antioxidant to keep a state of oil film stably in a high-temperature range around 150° C., where the sealing member 5 rapidly deteriorates by oxidation.

Moreover, with the electrolytic capacitor 1 of this embodiment, after the passage of 8000 hours, the capacitance change rate was less than 20%. Thus, the electrolytic capacitor 1 can provide stable characteristics for a long period in a high-temperature environment. Meanwhile, the ESR too remained low, indicating no adverse effect of the lipid-soluble antioxidant on the electrolyte in the electrolytic solution.

According to this embodiment, the capacitor element 10 can hold an electrolytic solution which can have a lipid-soluble antioxidant dissolved in an lipophilic solvent, and the separator 13 is in contact with the sealing member 5. Thus, the lipid-soluble antioxidant in the electrolytic solution is continuously supplied via the separator 13 to the sealing member 5, and this helps suppress deterioration of the sealing member 5 for a long period. It is thus possible to prevent evaporation of the electrolytic solution held by the capacitor element 10, and to maintain the characteristics of the electrolytic capacitor 1 stably for a long period.

The concentration of the lipid-soluble antioxidant in the electrolytic solution can be from 1% by weight to 30% by weight. This helps suppress an increase in man-hours, and helps maintain the antioxidant effect on the sealing member 5 for a long period.

The concentration of the lipid-soluble antioxidant in the electrolytic solution can be from 3% by weight to 20% by weight. This helps prolong the antioxidant effect and reduce man-hours.

The lipophilic solvent in the electrolytic solution can easily be implemented with gamma-butyrolactone.

The lipophilic solvent in the electrolytic solution can easily be implemented with a liquid containing: at least one of sulfolane, ethylene glycol, and diethylene glycol; and a nonionic surfactant.

The nonionic surfactant can easily be implemented with a liquid having polyethylene glycol or polyglycerin coupled with a lipophilic group.

The nonionic surfactant can easily be implemented with a copolymer of polyethylene glycol with polypropylene glycol.

The lipid-soluble antioxidant in the lipophilic solvent can easily be implemented with a lipid-soluble vitamin.

The lipid-soluble vitamin dissolved in the lipophilic solvent in the lipophilic solvent can easily be implemented with tocopherol or tocotrienol.

The separator 13 can protrude farther toward the sealing member 5 than the anode and cathode foils 11 and 12. Thus, the separator 13 can easily be brought into contact with the sealing member 5.

The ridge of the constriction that protrudes from the inner face of the body case 3 can be located farther from the capacitor element 10 than is the middle of the sealing member in its thickness direction. This permits a middle part of the sealing member 5 to protrude toward the capacitor element 10, and thus the separator 13 lies along the sealing member 5 such that the former makes secure contact with the latter at a plurality of points or across an area.

Second Embodiment

Next, a second embodiment will be described. In this embodiment, the capacitor element 10 holds, instead of an electrolytic solution, a solid electrolyte (not illustrated) along with a predetermined functional liquid. In other respects, this embodiment is similar to the first embodiment.

The solid electrolyte is composed of an electrically conductive polymer or the like. The electrically conductive polymer helps reduce the ESR of the electrolytic capacitor 1. Usable as the electrically conductive polymer is, for example, polythiophene, polypyrrole, or a derivative of any of those. Polyethylene dioxythiophene is particularly preferable for its high electrical conductivity.

Immersing the capacitor element 10 in a dispersion liquid of the electrically conductive polymer for a predetermined length of time and then drying the result permits the solid electrolyte composed of the electrically conductive polymer to be held between the anode and cathode foils 11 and 12.

Also held between the anode and cathode foils 11 and 12 is a functional liquid with a function of increasing the withstand voltage. The functional liquid is a solution having a lipid-soluble antioxidant dissolved in a lipophilic solvent. As the lipophilic solvent, gamma-butyrolactone can be used. Also usable as the lipophilic solvent is a liquid containing a nonionic surfactant in at least one of sulfolane, ethylene glycol, and diethylene glycol. Usable as the nonionic surfactant is polyethylene glycol or polyglycerin coupled with a lipophilic group, a copolymer of polyethylene glycol with polypropylene glycol, or the like. Any of these lipophilic solvents helps increase the withstand voltage, and permits the lipid-soluble antioxidant to dissolve.

As the lipid-soluble antioxidant, an antioxidant that is soluble in a lipophilic solvent, for example a lipid-soluble vitamin, can be used. Examples of lipid-soluble vitamins include, for example, vitamin A (retinol, α-carotene, β-carotene, β-cryptoxanthin), vitamin D (vitamin D2, vitamin D3), vitamin E (tocopherol, tocotrienol), and vitamin K (vitamin K1, vitamin K2, menaquinone-7).

The solid electrolyte becomes swollen with the functional liquid. This provides an increased degree of close contact of the solid electrolyte with the anode and cathode foils 11 and 12, between which the solid electrolyte is held. This helps reduce the ESR of the electrolytic capacitor 1. Thus, the functional liquid also has a function of reducing the ESR of the electrolytic capacitor 1.

As in the first embodiment, the separator 13 of the capacitor element 10 is in contact with the sealing member 5, and the lipid-soluble antioxidant in the functional liquid is supplied via the separator 13 to the sealing member 5. The lipid-soluble antioxidant seeps through intermolecular gaps inside the sealing member 5 to reach the inside of the sealing member 5 and the outer face (the face opposite from the capacitor element 10) of the sealing member 5. As a result, the outer face of the sealing member 5 is covered with the lipid-soluble antioxidant in the form of oil film.

Thus, while contact between the sealing member 5 and the oxygen in air is suppressed, the lipid-soluble antioxidant engages in an oxidation reaction with the oxygen at the surface of or inside the sealing member 5. This makes it possible to suppress oxidation-induced deterioration of the sealing member 5, and to prevent the functional liquid from leaking out.

With this embodiment, the capacitor element 10 holds a functional liquid, which results from dissolving a lipid-soluble antioxidant in a lipophilic solvent, along with a solid electrolyte, and the separator 13 is in contact with the sealing member 5. Thus, the lipid-soluble antioxidant in the functional liquid is continuously supplied via the separator 13 to the sealing member 5, and this helps suppress degradation of the sealing member 5 for a long period. It is thus possible to prevent the functional liquid held by the capacitor element 10 from leaking out, and to maintain the characteristics of the electrolytic capacitor 1 for a long period.

In this embodiment, an electrolytic solution having an electrolyte dissolved in the above-mentioned functional liquid can be held between the anode and cathode foils 11 and 12. Holding the solid electrolyte and the electrolytic solution between the anode and cathode foils 11 and 12 helps achieve an enhanced function of repairing oxide coats, and to further reduce the ESR of the electrolytic capacitor 1.

INDUSTRIAL APPLICABILITY

The present invention finds applications in electrolytic capacitors and in automobiles, electronic appliances, and the like that incorporate electrolytic capacitors in their control circuits.

REFERENCE SIGNS LIST 1 electrolytic capacitor
2 capacitor body
3 body case
3c opening
3d constriction
5 sealing member
5a, 5b through hole
6 seat plate
6a, 6b through hole
7, 8 lead terminal
10 capacitor element
11 anode foil
12 cathode foil
13 separator
14 tape

The invention claimed is:

1. An electrolytic capacitor, comprising:
a capacitor element having an anode foil and a cathode foil wound up with a separator in between, the capacitor element holding a predetermined solution between the anode and cathode foils;
a body case in which the capacitor element is housed; and
a sealing member with which the body case is sealed, wherein the solution has a lipid-soluble antioxidant dissolved in a lipophilic solvent,
a width of the separator in a shorter-side direction thereof is larger than a width of the anode and cathode foils in a shorter-side direction thereof, and the separator protrudes farther toward the sealing member than the anode and cathode foils, and
a central part of a face of the sealing member close to the capacitor element protrudes toward the capacitor element such that the separator is in contact with the sealing member.

2. The electrolytic capacitor according to claim 1, wherein the capacitor element holds a solid electrolyte.

3. The electrolytic capacitor according to claim 1, wherein the solution is an electrolytic solution having the lipid-soluble antioxidant and an electrolyte dissolved in the lipophilic solvent.

4. The electrolytic capacitor according to claim 3, wherein a concentration of the lipid-soluble antioxidant in the electrolytic solution is from 1% by weight to 30% by weight.

5. The electrolytic capacitor according to claim 3, wherein a concentration of the lipid-soluble antioxidant in the electrolytic solution is from 3% by weight to 20% by weight.

6. The electrolytic capacitor according to claim 1, wherein the lipophilic solvent is gamma-butyrolactone.

7. The electrolytic capacitor according to claim 1, wherein the lipophilic solvent contains:
at least one selected from the group consisting of sulfolane, ethylene glycol, and diethylene glycol; and
a nonionic surfactant.

8. The electrolytic capacitor according to claim 7, wherein the nonionic surfactant is polyethylene glycol or polyglycerin coupled with a lipophilic group.

9. The electrolytic capacitor according to claim 7, wherein the nonionic surfactant is a copolymer of polyethylene glycol with polypropylene glycol.

10. The electrolytic capacitor according to claim 1, wherein the lipid-soluble antioxidant is a lipid-soluble vitamin.

11. The electrolytic capacitor according to claim 10, wherein the lipid-soluble vitamin is tocopherol or tocotrienol.

12. The electrolytic capacitor according to claim 1, wherein the body case has a constriction protruding from an inner face thereof to press a circumferential face of the sealing member, and
a ridge of the constriction is located farther from the capacitor element than is a middle of the sealing member in a thickness direction thereof.

* * * * *